United States Patent
Goebel et al.

(10) Patent No.: US 6,928,766 B1
(45) Date of Patent: Aug. 16, 2005

(54) AUTOMATIC OUTRIGGER LOCK

(75) Inventors: Michael J Goebel, Plantation, FL (US); Peter D. Ryan, Fort Lauderdale, FL (US)

(73) Assignee: Pipe Welders, Inc., Fort Lauderdale, FL (US)

( * ) Notice: Subject to any disclaimer, the term of this patent is extended or adjusted under 35 U.S.C. 154(b) by 0 days.

(21) Appl. No.: 10/065,488

(22) Filed: Oct. 23, 2002

(51) Int. Cl.⁷ .............................................. A01K 91/00
(52) U.S. Cl. ...................................... 43/27.4; 114/255
(58) Field of Search ................................ 43/27.2, 27.4; 114/255; 248/221.11, 225.21; 403/321, 322.1, 403/322.2, 322.4

(56) References Cited

U.S. PATENT DOCUMENTS

| | | | | |
|---|---|---|---|---|
| 2,726,060 | A | * 12/1955 | Elsner | ........................ 248/509 |
| 2,727,707 | A | 12/1955 | Wells | |
| 2,833,522 | A | * 5/1958 | Michaels | ................. 256/65.13 |
| 2,997,188 | A | 8/1961 | Hauser | |
| 3,280,439 | A | * 10/1966 | McCarthy | .................... 24/613 |
| 4,384,542 | A | * 5/1983 | Wilson | ........................ 114/255 |
| 4,813,171 | A | 3/1989 | Cooper et al. | |
| 4,836,707 | A | * 6/1989 | Myers | ...................... 403/322.4 |
| 5,140,928 | A | * 8/1992 | Frick | .......................... 114/255 |
| 5,921,196 | A | * 7/1999 | Slatter | ........................ 114/255 |
| 6,155,154 | A | * 12/2000 | Hsu | .......................... 83/508.3 |
| 6,203,236 | B1 | * 3/2001 | Gautier et al. | ........... 403/322.1 |
| 6,408,779 | B1 | * 6/2002 | Roy | ............................ 114/255 |
| 6,561,724 | B1 | * 5/2003 | Carletti | ....................... 403/315 |

\* cited by examiner

*Primary Examiner*—Kurt Rowan
(74) *Attorney, Agent, or Firm*—Malin, Haley & DiMaggio, P.A.

(57) ABSTRACT

An automatic outrigger securing assembly, for use on a fishing boat which has structural support members on the vessel. The securing assembly includes a coupler for releasably securing the outrigger in a fixed position, as well as a collar assembly for interfacing with the coupler. The coupler receives and locks the collar means in a select position, and also includes a release mechanism for the collar. When the outrigger is in a laydown or collapsed configuration, the securing assembly automatically receives and safely retains the outrigger in a desired position, and can also automatically release the outrigger.

4 Claims, 3 Drawing Sheets

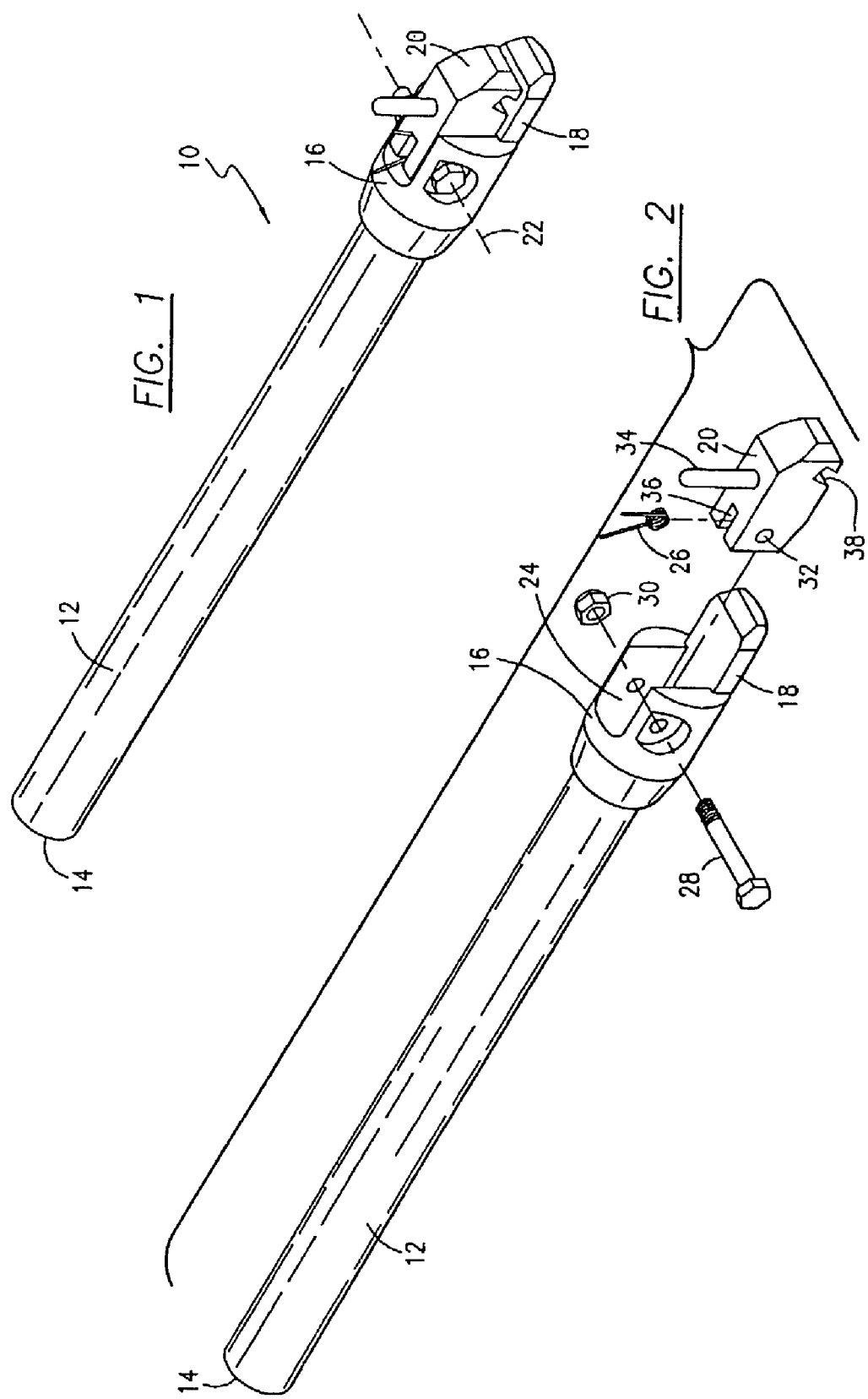

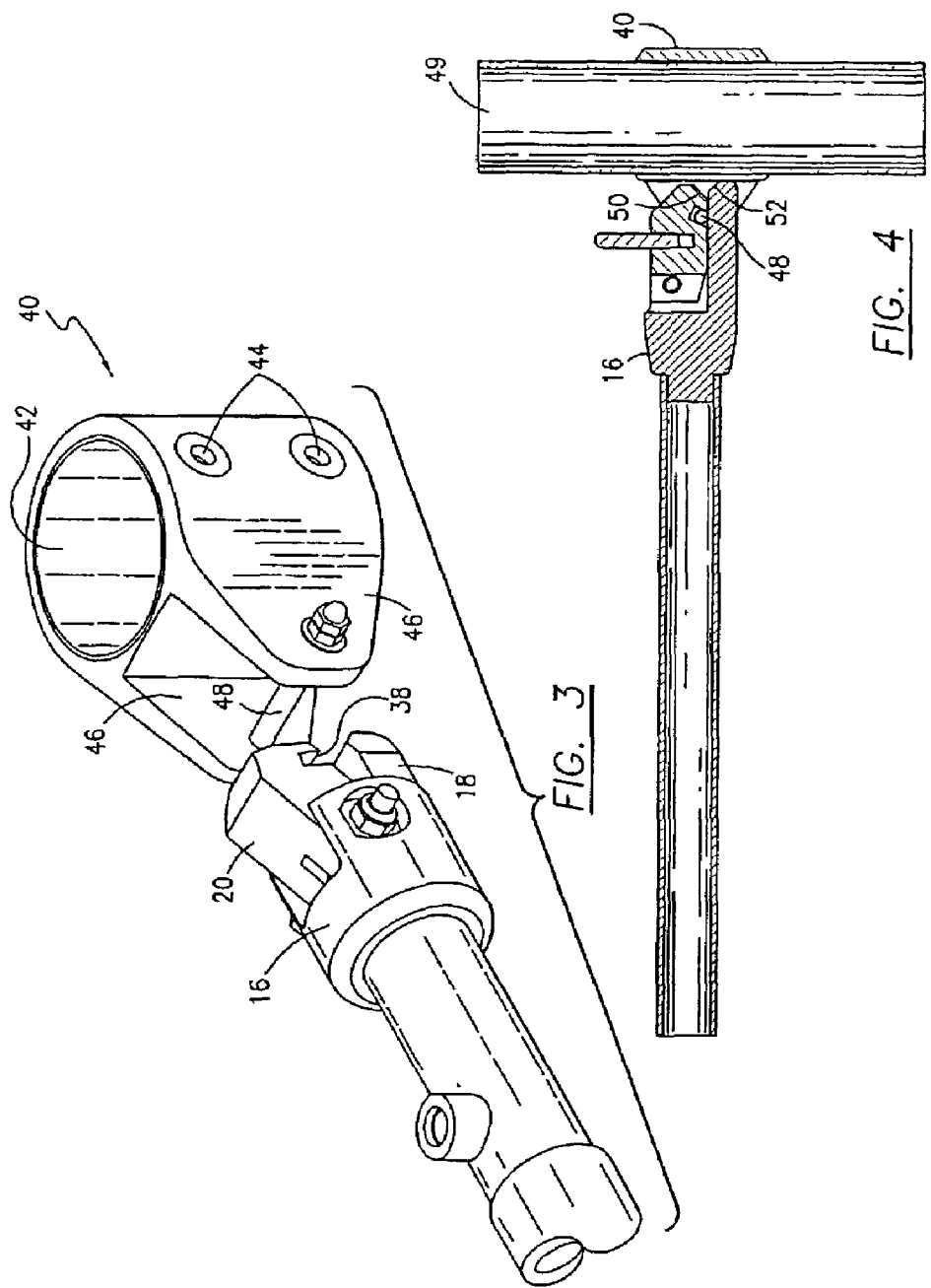

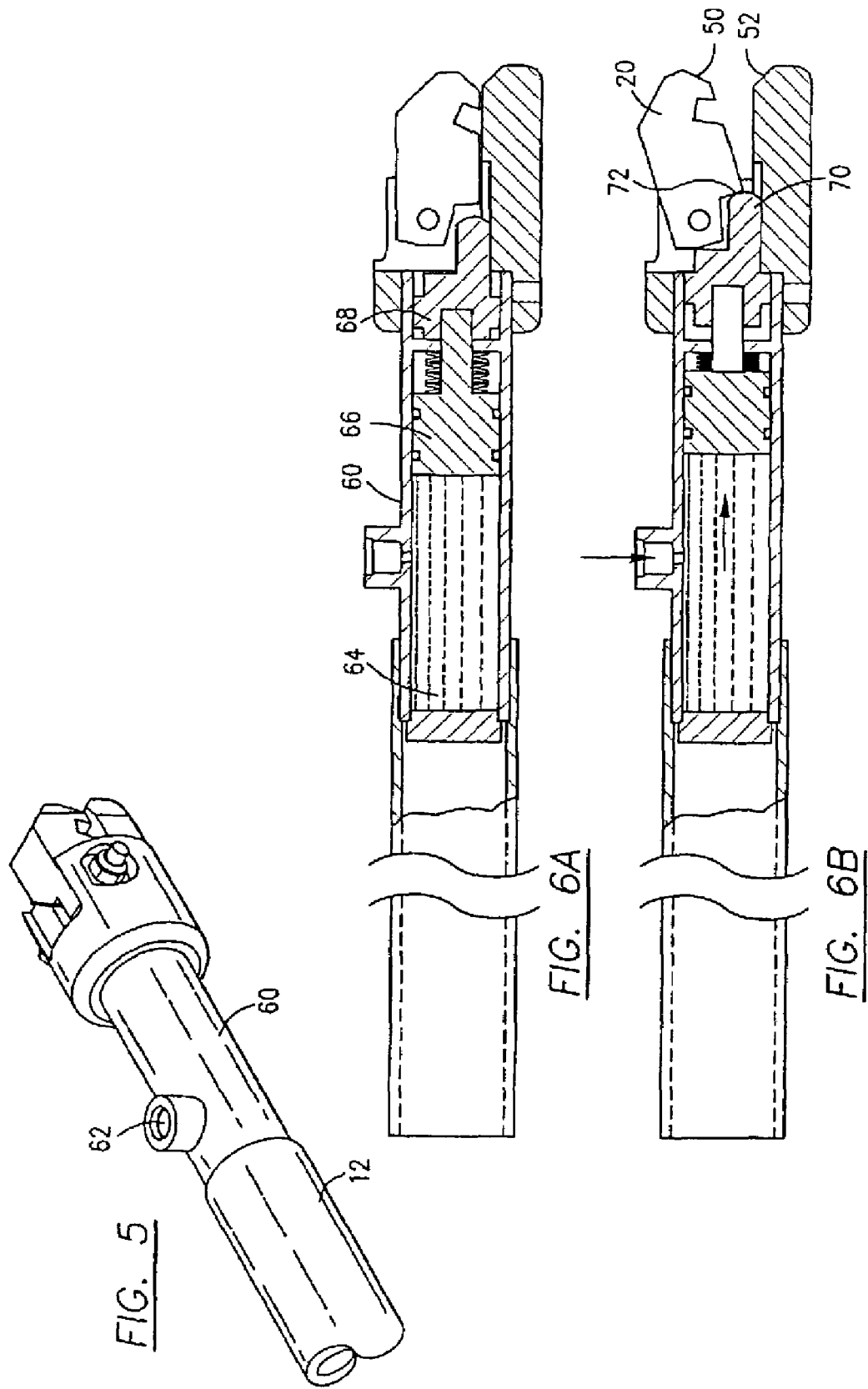

AUTOMATIC OUTRIGGER LOCK

BACKGROUND OF INVENTION

The Present invention relates to an assembly for securing fishing outriggers, and more particularly to an automatic locking and release system, which safely and efficiently maintains fishing outriggers in secured positions, when they are in the laydown or collapsed configuration.

DESCRIPTION OF RELATED ART

Outrigger designs in the marine industry have heretofore addressed in general the problem of safely stowing outrigger masts, when they are not in the extended positions for use when fishing, or when the vessel is engaged in other marine activities such as kite flying. Outriggers are attached about the sides of a vessel for use in substantially extending the fishing lines away from the boat to prevent the inadvertent tangling of lines, and also to achieve a wider presentation of bait and trolling lures for game fish in order to cover a wider area of water. It is appreciated that an outrigger is separate and apart from the fishing rod and reel, and generally includes a main mast or outrigger pole, spreaders, and guy wires, which are used to stabilize the outrigger as the pole bows or flexes when the boat encounters waves, turbulence or in windy conditions. Outriggers extend substantially away from the hull of the boat, and typically can range from fifteen to forty feet in length. Separate cables or lines contain clips which are attached to the fishing line of the rod and reel, such that when a fish hits the bait, the line is released from the clip and the fisherman is then in a fish fighting position free of any hindrance from the outrigger.

One problem with outriggers is that they are in the extended or layout position only when fishing or trolling at relatively low speeds, such as five knots. In other instances, such as when the vessel is cruising, the outriggers are collapsed in the layback or laydown position so that they do not interfere with marine navigation. In the laydown position, the outriggers are also substantially lowered to pass through bridges or other overhead obstructions, and they are also extended directly backwards about the hull of the boat and substantially equal to the vessel's beam. In this configuration, there is no obstruction or potential or interference with other closely passing vessels or any other objects in close proximity to the boat.

It is therefore appreciated that a mechanism is needed to quickly and efficiently allow the captain or fishing mates to release the outriggers from secured positions, extend the outriggers away from the vessel on both sides and prepare for fishing. Similarly, such a mechanism is needed to quickly retract outriggers to the extreme laydown or stowed positions, and lock them in place as easily as possible.

The prior art has attempted to address these problems in a variety of ways. For example, U.S. Pat. No. 4,388,774 discloses a system for extending the line of fishing rods beyond the sides of a vessel by use of a winch.

U.S. Pat. No. 4,813,171 issued to Cooper, et al, discloses a lateral fishing outrigger which is pivotally attached to the side of the boats, and incorporates a power-operated actuator. The '171 patent teaches of a mechanical linkage system which is used to extend and retract the main outrigger mast, and also describes its preferred method for securing the outrigger when not in use. Prior art devices use a catch which is physically placed over a hook (SEE FIG. 1), the latter being mounted about the side of the boat. A rope is incorporated for the boat operator to reach outside of the hull of the vessel, and manually pull the outrigger mast toward the boat, until the relatively short catch is latched on the hook to maintain the main pole in position. This design is typical of the prior art, and the '171 teaching was meant to overcome the requirements of manual manipulation through the use of a system incorporating hydraulics, pistons and other mechanisms in deploying the rigger (See FIGS. 1 and 2 and related discussion).

U.S. Pat. No. 4,384,542 entitled Outrigger Device, was issued to Wilson for a conventional outrigger which is attached to a flying bridge or tower leg. The '542 patent discloses a collapsible rigger assembly which incorporates a dual linkage system, one of which is permanent in length and rotates about select pivot points, and the other being a mechanically collapsible link which pivots like a hinge for extension. (See FIGS. 2, 4).

Other outrigger designs include a relatively short link or pipe which is manually attached to an outrigger pole using a simple bracket and pivot point design. When the outrigger pole is near the vessel, the pipe is manually secured through a bracket using a bolt and nut, or quick release pin. The prior art therefore fails to provide an automatic outrigger locking mechanism which does not require operator involvement and facilitates rapid deployment and retrieval of outriggers. Such a device is needed in competitive conditions such as fishing tournaments, or alternatively rapid retrieval in emergency situations or when maneuvering to avoid obstructions. Thus, there still exists a need for an operationally efficient automatic outrigger locking device, yet one which is relatively simple in mechanical design.

Accordingly, what is needed in the marine industry is an improved outrigger securing assembly which overcomes the problems associated with mechanical designs that require operator involvement, yet do not comprise complex systems involving electronics and/or hydraulics. The automatic assembly must not impede general performance of both the vessel when operating at relatively high speeds, when securing the outrigger, as well as when it is desired to deploy the outriggers for fishing. It is, therefore, to the effective resolution of the aforementioned problems and shortcomings of the prior art that the present invention is directed. However, in view of the outrigger designs in the marine industry in existence at the time of the present invention, it was not obvious to those persons of ordinary skill in the pertinent art as to how the identified needs could be fulfilled in an advantageous manner.

SUMMARY OF INVENTION

The present invention contemplates an improved and modified automatic locking assembly for stowing an outrigger in a secured position about the hull of the boat, when the outrigger is in the retracted or laydown position. The improved design includes a coupler which is attached at its proximate end to a support member of the boat or hull. At its distal end, the coupler includes a head mounted thereon. The head includes a plurality of jaws, at least one of which is moveable. A complementary jaw includes a channel or recessed grove, which releasably secures a pin member mounted on an interfacing collar assembly. The head also includes a biasing mechanism such as a coil spring, maintaining the jaws in a normally closed position, and a lever arm for pivoting one of the jaws and releasing the collar pin.

The invention also includes a collar assembly, having a cylindrical sleeve which is adapted to be mounted on an outrigger mast or pole. The sleeve includes a pair of planar protrusions which are integrally associated with the cylindrical sleeve. A pin, bolt or other engaging member is mounted between the flanges, for interfacing with the jaws of the coupler head.

The invention is essentially automatic in operation, such that when an outrigger is swung back from an extended or fishing position, toward the vessel it will encounter the head of the coupler when they are properly aligned. The jaws open to receive the pin member, and secure the collar assembly and outrigger in a locked position, until such time as it is desired to release the outriggers, and deploy the unit in a fishing configuration.

In an alternative design, the invention includes a hydraulic cylinder and piston assembly which is mounted within the coupler arm. When layout of the outrigger is desired, a control switch is used to activate the hydraulic cylinder, which results in a piston/cam assembly automatically opening the jaws to release the collar. The above-described design and specifications provide an improved automatic locking assembly for outriggers which eliminate the necessity for manual operation, such as securing an outrigger about the side of the boat utilizing ropes, mechanical latches or hinges with insert pins, bolts and nuts, or chain and hook assemblies. This frees the captain or operator to navigate the boat, attend to instrumentation or electronics, or take care of the needs of mates or guests on board. This is especially true in emergency situations.

Additionally, the design must be relatively unobtrusive, such that it does not constitute a substantial mechanical obstruction or hindrance, awkward assembly, or otherwise interfere with the primary operation of the outrigger. This is especially to be appreciated when recognizing that an outrigger can be maneuvered in three dimensions, and move through horizontal and vertical planes, such that its outermost point, can be maintained at any desired location. The invention provides a clean and cleaver solution to the problems set forth above, and only requires a proper alignment between the coupler and the sleeve at one location, closest to the vessel.

In accordance with the instant invention, it is an object thereof to provide an improved automatic outrigger securing assembly, for use on a fishing vessel having structural support members thereon, which eliminates the requirement of manual operation.

It is a further object of the instant invention to provide an automatic outrigger securing assembly which includes a superior mechanical design, it is operationally efficient, and is easy to maintain.

It is a further object of the instant invention to provide an automatic outrigger securing assembly which does not interfere with the operation or performance of the outriggers.

It is a further object of the instant invention to provide an automatic outrigger securing assembly which is cost effective, and of a superior manufacturing design.

Still another object of the present invention is to provide an automatic outrigger securing assembly which is compatible with existing outrigger designs, and can be incorporated into original equipment, or alternatively retrofitted to existing boats.

A further object of the present invention is to provide an automatic outrigger securing assembly which includes all of the above-mentioned features and objects to provide a substantially superior design, eliminating the problems encountered by prior devices, and generally solving problems associated with manual operation.

These and other important objects, advantages, and features of this invention will become clear as this description proceeds hereinafter. The invention accordingly comprises the features of construction, engineering designs and components, the interrelationship thereto, combination of elements, and arrangement of parts that will be exemplified in the description set forth hereinafter.

In accordance with these and other objects which will become apparent hereinafter, the instant invention will now be described with particular reference to the accompanying drawings.

BRIEF DESCRIPTION OF DRAWINGS

FIG. 1 is a perspective view of an automatic outrigger securing assembly incorporating the instant invention.

FIG. 2 is a perspective, exploded view of the invention illustrated in FIG. 1.

FIG. 3 is a perspective view of the instant invention, illustrating the interfacing components thereof, in particular the coupler assembly and sleeve assembly.

FIG. 4 is a partial, cross-sectional, side plan view of the instant invention in a secured configuration.

FIG. 5 is a perspective view of an alternative embodiment of the instant invention, incorporating a hydraulic cylinder.

FIG. 6A is a partial, cross-sectional, side plan view of the instant invention, illustrating the piston assembly and head in a closed position.

FIG. 6B is a partial, cross-sectional, side plan view of the instant invention, illustrating the piston assembly and head in an opened position.

DETAILED DESCRIPTION

Turning to FIG. 1, an automatic outrigger securing coupling means 10 is shown, depicting the instant invention. Coupling means 10 includes support arm 12, proximate end 14 and head assembly 16.

For purposes of this disclosure, it is to be appreciated by one of ordinary skill in the marine industry, and more particularly one familiar with the design and manufacture of fishing outriggers, that outriggers are generally comprised of a main mast or pole which is extendable in a layout position for use during fishing or trolling maneuvers. Outriggers are deployed from a laydown or retracted position, where they are generally secured to a mechanism mounted on the hull of the boat, a gunnel, or alternatively about a support member located on the boat. The outrigger generally includes spreaders and guy wires which provide tension to the main outrigger mast, and prevent undesirable bending or swaying of the outrigger when in use. Conventional outriggers also include 2 or 3 support tubes or poles which are pivotally mounted about the boat using universal joints, hinged bracket assemblies, and the like. In this manner dual or tri-point mounting assemblies allow the outrigger to be manipulated in a variety of orientations, heights, or angular positions such that the fishing line can be precisely placed in relationship to the sides of the boat. In its most extreme, extended position, the outrigger forms a right angle with the longitudinal axis of the boat, and extends directly outwardly.

The instant invention is meant to accommodate the outrigger in a secured or locked position when it is in the completely retracted or laydown/layback position. In this configuration, the outrigger is in its closest proximity to the sides of the boat, the gunnels and/or the cabin or support structure on the vessel. The outriggers extend directly behind the boat, and are generally in their lower-most position, to provide minimum obstruction for cruising or docking.

Proximate end 14 is secured, and generally permanently mounted, to a fixed location or support member. For example, this could entail a plate mounted on the hull or cabin, the proximate end 14 being welded thereto. Alternatively, and a more common configuration, proximate end 14 is secured to a cylindrical tube or pipe support member on the boats, e.g., legs of a Tuna tower, Marlin tower, flying bridge, bimini top or T-top. As will be appreciated to one of ordinary skill, a variety of different techniques or mounting assemblies can be utilized to mount the support arm in a precise location.

Again with reference to FIGS. 1 and 2, coupler head 16 interfaces with a collar means, the latter being described in detail hereinafter. Head 16 includes a plurality of jaws 18 and 20. At least one such jaw is movable, and in a particular embodiment upper jaw 20 rotates about axis 22.

With particular reference to FIG. 2, the head assembly is depicted in an exploded position, illustrating its components. Lower jaw 18, can be integrally formed within head 16, and provide the complementary base for upper jaw 20. Head 16 includes a generally rectangular cavity 24, which receives the upper jaw and coil spring 26. The upper jaw is inserted into the cavity of the head, and secured by pin assembly or bolt 28 and nut 30. Upper jaw 20 includes aperture 32 which receives the bolt 28. Upper jaw 20 can also include release means 34, which is a pin mounted about the uppermost surface of the jaw. The upper jaw also includes a recessed cavity 36 which receives tension spring 26.

When head 16 is fully assembled with the complementary jaws and associated components, biasing means 26 is placed within the cavity 36, and placed thereafter the jaw is in position on the head. Bolt 28 is inserted into the upper jaw, through spring 26, and secured in place by nut 30. Upper jaw 20 rotates about pin 28 through use of release pin 34, and is biased in a closed position by spring 26.

Upper jaw 20 can also include a channel or recessed groove 38, which receives and locks a pin assembly of the collar means described hereinafter.

With reference to FIG. 3, collar means 40 is illustrated. In a particular embodiment, collar means 40 comprises a cylindrical sleeve or collar 42. The cylindrical sleeve is secured to a tubular member of the outrigger, which generally is the main outrigger pole. However, it is to be appreciated that the collar could be place about any cylindrical component of the outrigger assembly. The collar means could also be of a different geometric shape, to accommodate any similar shape associated with the outrigger. The cylindrical sleeve could be welded to the outrigger, or alternatively mounted thereon utilizing quick release pins, or bolts and nuts secured through apertures 44.

A general bracket assembly, or similar mechanical structure can be utilized to mount the collar means pin assembly. In a particular embodiment, a pair of generally rectangular, parallel flanges 46 protrude outwardly from sleeve 42, and a pin means 48 is mounted there between. Pin means 48 generally comprises a pin or bolt which interfaces with the complementary jaws of head 16. FIG. 3 illustrates the coupler means engaging the collar means. In particular, the complementary jaws 18 and 20 open automatically to receive pin or bolt 48, or alternative interlocking assembly, within channel 38.

As illustrated in FIG. 4, once the pin assembly is placed within the jaws, the pin encounters channel 38, and the upper jaw 20 rotates toward the biased, closed position, and locks the collar means in place, thereby simultaneously locking the outrigger in a secured position.

It can be seen that the general bracket assembly or flange protrusions are dimensioned to accommodate the protruding jaws of the head assembly, which are further secured and maintained in place by the inner walls of the flanges. Additionally, the front surfaces of the jaws incorporate angled planar surfaces 50 and 52 on the front of the upper and lower jaws respectively, which facilitate insertion of pin 48 into the jaw assembly. As the collar and pin assembly engage the coupler head, the pin encounters the angled surfaces of the complementary jaws, and the force applied is adequate to easily open the jaws. Upper jaw 20 rotates and opens, until the pin has been fully inserted therein. Once the pin is positioned about channel 38, the upper jaw then closes as described above. FIG. 4 illustrates a cross-sectional, side view of the instant invention in a locked position, the collar pin 48 being secured in place within the complementary jaws of head 16. Sleeve means 40 is also shown mounted upon outrigger pole 49.

With reference to FIG. 5, an alternative embodiment is illustrated wherein a hydraulic cylinder assembly 60 is mounted within support arm 12. The cylinder includes a connecting port 62 to attach to a hydraulic line (not shown) to provide an inlet for supplying hydraulic or pneumatic fluid to the cylinder.

FIG. 6A illustrates a cross-sectional, side plan view of the instant invention incorporating the hydraulic cylinder 60. This cylinder includes an internal housing for hydraulic fluid 64, a piston assembly 66 and a cam 68. When a pump is activated to supply hydraulic fluid under pressure, the fluid forces the piston to move in a forward direction, within the head 16, and toward upper jaw 20. Once the foremost arm 70 of the cam assembly encounters surface 72 of the upper jaw, it forces the jaw to rotate upwardly in an open position, and therefore the head is able to receive the interlocking pin of the collar means. Once the interlocking pin is inserted into the complementary jaws, the hydraulic cylinder is depressurized and the head assembly closes automatically in a locked position. Releasing the collar assembly merely requires activation of the hydraulic cylinder through a control switch (not illustrated).

The various components of the instant invention can be manufactured utilizing high grade aluminum components and extrusions. Alternatively, stainless steel can be used, and irrespective of any particular material, it is desired that they are manufactured using 100% marine grade, heavy-duty materials.

It will be seen that the objects set forth above, and those made apparent from the foregoing description, are efficiently attained and certain changes may be made in the engineering design and construction, without departing from the scope of the invention. It is intended that the foregoing description, examples, and designs showing the accompanying drawings shall be interpreted as illustrative, and not in a limiting sense.

The instant invention has been shown and described herein in what is considered to be the most practical and preferred embodiment, and alternative embodiments thereof. It is recognized, however, that departures may be made therefrom within the scope of the invention and that obvious modifications will occur to persons of ordinary skill in the art.

What is claimed is:

1. An automatic outrigger securing assembly, for use on a fishing boat having structural support members and an outrigger, said outrigger securing assembly comprising:

coupling means for releasably securing said outrigger in a fixed position about said boat;

collar means for interfacing with said coupling means, said collar means including means for attachment to an outrigger, and interlocking means for insertion into said coupling means;

said means for attachment comprising a cylindrical sleeve, and said interlocking means comprises a pair of generally parallel flanges, said flanges protruding from said sleeve and integrally associated therewith, said interlocking means further including pin means interposed said flanges, and mounted thereto;

said coupling means receiving and locking said collar means;

said coupling means further including means for releasing said collar means;

whereby, when said outrigger is in a laydown or collapsed configuration, in close proximity to said boat, said securing assembly automatically receives and safely retains said outrigger in a desired position.

2. The apparatus of claim 1, wherein said coupling means includes a support arm and a head mounted about one end of said arm;

said head further including upper and lower complementary jaws, at least one of said jaws being moveable, and means for biasing said jaws in a closed position.

3. The apparatus of claim 2, wherein at least one of said jaws includes recessed channel means for retaining said collar means.

4. An automatic outrigger securing assembly, for use on a fishing boat having structural support members and an outrigger, said outrigger securing assembly comprising:

a coupler releasably securing said outrigger in a fixed position about said boat, said coupler including a support arm having two ends, one said end mounted on a support member of said boat, the opposite end having a head mounted thereon;

said head including upper and lower complementary jaws, at least one of said jaws being moveable, and means for biasing said jaws in a closed position;

a collar for interfacing with said coupler, said collar comprises a cylindrical sleeve for attachment to said outrigger;

an interlocking pin assembly comprising a pair of generally parallel flanges, said flanges protruding from said sleeve and integrally associated therewith;

a pin interposed said flanges, and secured thereto, said jaws receiving and locking said pin;

said head further including means for releasing said pin;

whereby, when said outrigger is in a laydown or collapsed configuration, in close proximity to said boat, said securing assembly automatically receives, releasably locks, and safely retains said outrigger until such time that release is desired.

* * * * *